United States Patent [19]

Dübal et al.

[11] Patent Number: 4,906,401

[45] Date of Patent: Mar. 6, 1990

[54] USE OF LIQUID-CRYSTAL 5-PHENYLPYRIMIDINE DERIVATIVES AS COMPONENTS OF SMECTIC LIQUID-CRYSTAL MIXTURES

[75] Inventors: Hans-Rolf Dübal, Königstein/Taunus; Claus Escher, Mühltal; Wolfgang Hemmerling, Sulzbach (Taunus); Ingrid Müller, Hofheim am Taunus; Dieter Ohlendorf, Liederbach; Rainer Wingen, Hattersheim am Main, all of Fed. Rep. of Germany

[73] Assignee: Hoechst Aktiengesellschaft, Frankfurt am Main, Fed. Rep. of Germany

[21] Appl. No.: 378,470

[22] Filed: Jul. 12, 1989

Related U.S. Application Data

[63] Continuation of Ser. No. 171,565, Mar. 22, 1988, abandoned.

[30] Foreign Application Priority Data

Mar. 24, 1987 [DE] Fed. Rep. of Germany ....... 3709549

[51] Int. Cl.$^4$ .......................... G02F 1/13; C09K 19/34
[52] U.S. Cl. .......................... 252/299.61; 252/299.01; 350/350 R; 350/350 S
[58] Field of Search ............. 252/299.61, 299.01; 350/350 R, 350 S; 544/318, 315, 242, 335

[56] References Cited

U.S. PATENT DOCUMENTS

| | | |
|---|---|---|
| 4,565,425 | 1/1986 | Petrzilka ....................... 252/299.61 |
| 4,676,604 | 6/1987 | Petrzilka et al. ............... 252/299.61 |
| 4,776,973 | 10/1988 | Bofinger et al. ................ 252/299.61 |
| 4,780,241 | 10/1988 | Furukawa et al. ............. 252/299.61 |
| 4,818,428 | 4/1984 | Schenble et al. ............... 252/299.61 |
| 4,820,839 | 4/1989 | Krause et al. .................. 252/299.61 |
| 4,834,904 | 5/1984 | Krause et al. .................. 252/299.61 |

FOREIGN PATENT DOCUMENTS 199004 10/1986 European Pat. Off. ....... 252/299.61

206228 12/1986 European Pat. Off. ....... 252/299.61
225195 6/1987 European Pat. Off. ....... 252/299.61
260077 3/1988 European Pat. Off. ....... 252/299.61

(List continued on next page.)

OTHER PUBLICATIONS

Zaschke, H., Advances in Liquid Crystal Research & Applications, Bata, L., Ed., Pergamon Press, Oxford, pp. 1059–1074 (1980).

Demus, D. et al., Flüssice Kristalle in Tabellen II, veb Deutscher Verlag fur Grund Stoffindustrie, Leipzig, pp. 376–379 (1984).

(List continued on next page.)

Primary Examiner—Teddy S. Gron
Attorney, Agent, or Firm—Curtis, Morris & Safford

[57] ABSTRACT

The compounds of the general formula (I)

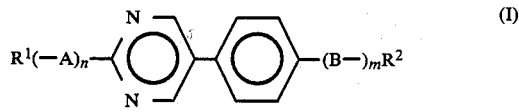

are particularly highly suitable as components of smectic, liquid-crystal mixtures, the symbols having the following meaning: $R^1$ and $R^2$ denote identical or different, straight-chain or branched alkyl or alkenyl groups which can contain asymmetric carbon atoms, containing 2 to 16 carbon atoms, in which one or more non-adjacent —$CH_2$— groups can be replaced by —O— and/or —S—, —A and —B each denote group

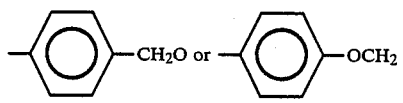

in which the radicals $R^1$, $R^2$, in each case, are situated at the phenylene part of —A, —B and m and n denote 0 or 1, but m+n is always zero or 1.

5 Claims, 1 Drawing Sheet

FOREIGN PATENT DOCUMENTS

| | | |
|---|---|---|
| 269062 | 6/1988 | European Pat. Off. ....... 252/299.61 |
| 3500897 | 7/1982 | Fed. Rep. of Germany ................. 252/299.61 |
| 3506446 | 8/1986 | Fed. Rep. of Germany ................. 252/299.61 |
| 3515373 | 11/1986 | Fed. Rep. of Germany ................. 252/299.61 |
| 3515374 | 11/1986 | Fed. Rep. of Germany ................. 252/299.61 |
| 3518734 | 11/1986 | Fed. Rep. of Germany ................. 252/299.61 |
| 63-48270 | 2/1988 | Japan ............................. 252/299.61 |
| 86/06401 | 11/1986 | World Int. Prop. O. ...... 252/299.61 |
| 87/05018 | 8/1987 | World Int. Prop. O. ...... 252/299.61 |

OTHER PUBLICATIONS

Sharma, N. K. et al., Molecular Crystals Liq. Cryst., vol. 151, pp. 225–231 (1987).

Zaschke et al., Chemical Abstracts, vol. 87, p. 608, 184456d (1977).

Mueller et al., Chemical Abstracts, vol. 110, p. 659, 67361b (1989).

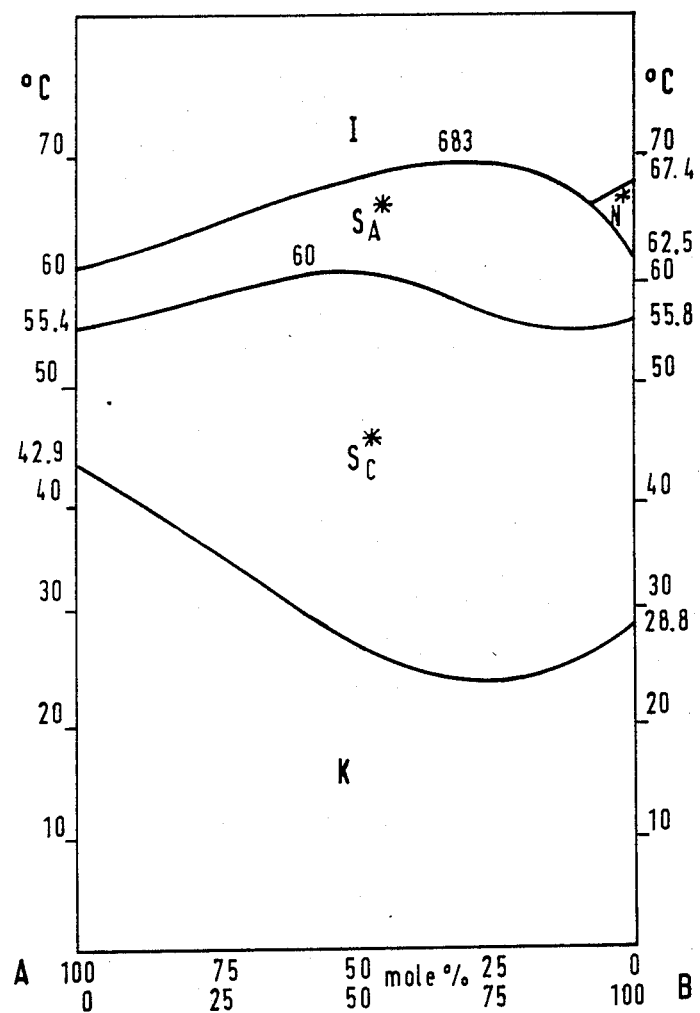

USE OF LIQUID-CRYSTAL 5-PHENYLPYRIMIDINE DERIVATIVES AS COMPONENTS OF SMECTIC LIQUID-CRYSTAL MIXTURES

This application is a continuation of application Ser. No. 171,565, filed Mar. 22, 1988 now abandoned.

Liquid crystals have, particularly in the last decade, been introduced into a wide range of technical fields in which electrooptical and display device properties are in demand (for example in watch, pocket-calculator and typewriter displays). These display devices are based on the effects of dielectric alignment in the nematic, cholesteric and/or smectic phases of liquid-crystal compounds, the molecular longitudinal axis of the compounds, due to the dielectric anisotropy, adopting a preferred alignment in an applied electrical field. The usual switching times in these display devices are rather too slow for many other potential areas of application of liquid crystals, which are per se highly promising chemical compounds for industry due to their unique properties. This disadvantage is particularly noticeable if it is necessary to address a large number of image points, which means that the production costs of instruments containing relatively large areas, such as video equipment, oscillographs or TV, radar, EDP or word processor screens, would be too high.

Besides the nematic and cholesteric liquid crystals, ferroelectric, smectic liquid-crystal phases have in the last few years become increasingly important.

Clark and Lagerwall have been able to show that the use of such liquid-crystal systems in very thin cells leads to optoelectric switching or display elements which, compared to conventional TN ("twisted nematic") cells have switching times which are faster by a factor of about 1,000 (cf. for example Lagerwall et al. "Ferroelectric Liquid Crystals for Displays", SID Symposium, October Meeting 1985, San Diego, Calif., USA). As a consequence of these and other favorable properties, for example the possibility of bistable switching and the contrast which is virtually independent of the view angle, FLCs are generally highly suitable for the above mentioned areas of application, for example via matrix addressing.

For practical use of ferroelectric liquid crystals in optoelectric displays, chiral, tilted smectic phases, for example $S_c^*$ phases, are required (R. B. Meyer, L. Liébert, L. Strzelecki and P. Keller, J. Physique 36, L-69 (1975)), which are stable over a large temperature range.

This goal can be achieved using compounds which themselves form chiral smectic phases, for example $S_c^*$ phases or, on the other hand, by doping non-chiral compounds which form tilted smectic phases with optically active compounds (M. Brunet, Cl. Williams, Ann. Phys. 3, 237 (1978)).

Therefore, there is a demand for compounds which form smectic phases and by means of which mixtures forming smectic, in particular $S_c$ or $S_c^*$ phases, can be prepared.

A great disadvantage of most currently available substances forming tilted smectic phases, in addition to the phase range limited in terms of temperature, is a low chemical, thermal or photochemical stability and a large positive dielectric anisotropy which is unfavorable for most applications.

It has now been found that compounds which are particularly well suited as components of smectic, liquid-crystalline mixtures are those of the general formula (I)

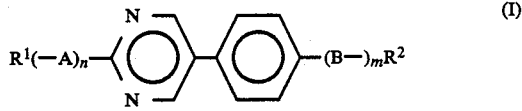

the symbols having the following meanings:

$R^1$ and $R^2$ denote identical or different, straight-chain or branched alkyl or alkenyl groups which can contain asymmetric carbon atoms, containing 2 to 16 carbon atoms, in which one or more non-adjacent —CH$_2$-groups can be replaced by —O— and/or —S—, —A and —B each denote

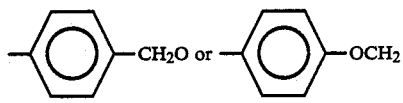

in which the radicals $R^1$, $R^2$, in each case, are situated at the phenylene part of —A, —B and m and n denote 0 or 1, but m+n is always zero or 1.

These compounds have a high chemical, thermal and photochemical stability. In addition, they have a negative or only a slight positive dielectric anisotropy (cf. Examples 1 to 3). Therefore, the dielectric properties of mixtures are favorably affected by components of the formula (I).

Moreover, chiral compounds of formula (I) also have a positive effect on the ferroelectric properties of the mixtures containing them, since they themselves already have good ferroelectric properties (Examples 1 and 8).

Particular preference is given to compounds of formula (I) having the special form (II)

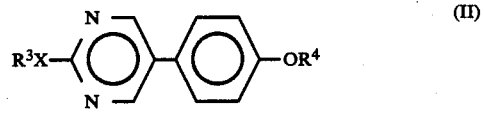

in which X has the meaning of —O, —S or denotes a single bond and $R^3$, $R^4$ each denotes identical or different, straight-chain or branched alkyl or alkenyl groups (including groups with or without asymmetric carbon atoms) having 7 to 14 carbon atoms.

Incidentally, it has been found that compounds of formula (II) form liquid-crystal $S_c$ or $S_c^*$ phases. To a large extent, they even have, in terms of temperature, very broad and predominantly favorable $S_c$ or $S_c^*$ ranges, that is ranges which are located at relatively low temperatures. This finding is the more surprising, since, based on common knowledge (for example "Flüssige Kristalle in Tabellen" (Liquid crystals in tables), VEB Deutscher Verlag für Grundstoffindustrie, Leipzig, Volume I (1974), Volume II (1984)), the appearance of $S_c$ or $S_c^*$ phases was not to be expected in compounds of formula (I) or (II).

Moreover, the compounds of formula (II) also have in many cases a $S_A$ phase in addition to the $S_c$ or $S_c^*$ phase which is very advantageous for their use. Compounds of formula (II) are therefore preferred components of chiral, smectic C phases (S$_c$*).

Preference is further given to compounds of formula (I) having n=1 or m=1. Most of these compounds have S$_c$ or S$_c$* phases and are suitable as mixing components in particular for expanding the S$_c$ or S$_c$* range to higher temperatures in combination with an advantageous effect on the dielectric behavior of the mixture.

It is particularly preferred to use compounds of formula (II) in S$_c$ or S$_c$* mixtures together with compounds of the known type

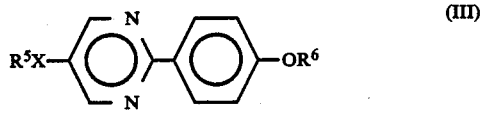

in which X=—O or denotes a single bond and R$^5$, R$^6$ are identical or different alkyl groups having 6 to 15 carbon atoms.

This is because it has been found, quite surprisingly, that the combined use of compounds of formula (II) and formula (III) can lead to an expansion of the S$_c$ or S$_c$* phase not only to lower but also to higher temperatures (induced S$_c$, cf. Example 3). This behavior is extremely unusual and advantageous for use.

The preparation of the compounds to be used according to this invention has been described in DE-A 3,709,618.

BRIEF DESCRIPTION OF THE DRAWING

FIG. 1 represents the binary phase diagram of compound A, (S)-2-octylthio-5-[4-(6-methyloctyloxy)phenyl] pyrimidine, admixed with compound B, 5-octyl-2-(4-octyloxyphenyl) pyrimidine, plotting temperature versus mole %.

The following examples are intended to illustrate the invention.

EXAMPLE 1

(S)-2-Octylthio-5-[4-(6-methyloctyloxy)phenyl]-pyrimidine has the phase sequence

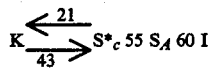

and at 40° C. a spontaneous polarization of 1.5 nC/cm$^2$ and has a switching time of 200 μs at an applied square voltage of 10 V$_{eff}$/μm. The tilting angle at this temperature is 25° and the dielectric anisotropy at 10 kHZ is Δε=−0.6.

EXAMPLE 2

(S)-2-Octyloxy-5-[4-(6-methyloctyloxy)phenyl]-pyrimidine has the phase sequence

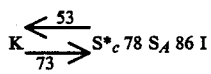

and the dielectricity constants ε″ (homeotropic orientation) and ε⊥ (planar orientation) at 10 kHz and 75° C.: ε″=3.5, ε⊥=3.8→Δε=−0.3.

EXAMPLE 3

2-Octyloxy-5-(4-octyloxyphenyl)pyrimidine has the phase sequence

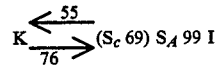

and the dielectricity constants parallel and perpendicular to the director (10 kHz, 75° C.) ε″=3.79, ε⊥=3.9→Δε=−0.11.

EXAMPLE 4

A mixture consisting of 50% of (S)-2-decylthio-5-[4-(6-methyloctyloxy)phenyl]pyrimidine 50% of (S)-2-octylthio-5-[4-(6-methyloctyloxy)phenyl]pyrimidine has the following phase sequence:

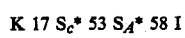

K 17 S$_c$* 53 S$_A$* 58 I

EXAMPLE 5

A mixture consisting of
30% of 5-decyl-2-(4-decyloxyphenyl)pyrimidine
55% of 5-octyl-2-(4-octyloxyphenyl)pyrimidine
10% of 5-decyl-2-(4-octyloxyphenyl)pyrimidine
5% of 2-octyloxy-5-[4-(4-decyloxyphenyl)methyloxyphenyl]pyrimidine
can be undercooled up to +7° C. and has the phase sequence S$_c$ 53 S$_A$ and S$_A$ 71 I

EXAMPLE 6

A mixture consisting of (S)-2-octylthio-5-[4-(6-methyloctyloxy)phenyl]pyrimidine (A) and the compound 5-octyl-2-(4-octyloxyphenyl)pyrimidine (B) which is known from the literature (Flussige Kristalle in Tabellen (Liquid crystals in tables), VEB Deutscher Verlag fur Grundstoffindustrie, Leipzig, 1974) and is not covered by formula (I), shows the following characteristic:

The highly surprising and extremely advantageous behavior upon mixing the two above mentioned substances can be seen from the binary phase diagram (heating curves) in the figure: the S$_c$* phase is expanded not only to low but also to high temperatures. This latter behavior has heretofore not been described before.

EXAMPLE 7

A mixture consisting of
80% of (S)-2-heptylthio-5-[4-(6-methyloctyloxy)-phenyl]pyrimidine
20% of (S)-2-nonyloxy-5-[4-(6-methyloctyloxy)-phenyl]pyrimidine
can be undercooled to less than −20° C. and has the phase sequence.

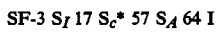

SF-3 S$_I$ 17 S$_c$* 57 S$_A$ 64 I

EXAMPLE 8

A mixture consisting of
45% of (S)-2-decylthio-5-[4-(6-methyloctyloxy)-phenyl]pyrimidine
45% of (S)-2-octylthio-5-[4-(6-methyloctyloxy)phenyl]-pyrimidine
10% of (R)-2-methylpropyl N-4-(4-octyloxybenzoyloxy)benzoyl-(S)-prolinate has a $S_c{}^*$ phase in the range from 10° C. to 42° C. and a spontaneous polarization of +30 nC/cm² at 25° C. and has a switching time in the SSFLC display of 45 μs at an applied square voltage of 10 $V_{eff}/\mu m$.

EXAMPLE 9

A mixture consisting of
40% of (S)-2-decylthio-5-[4-(6-methyloctyloxy)-phenyl]pyrimidine
40% of (S)-2-octylthio-5-[4-(6-methyloctyloxy)phenyl]-pyrimidine
2% of 5-undecyl-2-(4-decyloxyphenyl)pyrimidine
2% of 5-decyl-2-(4-octyloxyphenyl)pyrimidine
5.5% of 5-decyl-2-(4-decyloxyphenyl)pyrimidine
10.5% of 5-octyl-2-(4-octyloxyphenyl)pyrimidine
has a melting point of 5° C. and has a phase sequence of $S_I{}^*$ 18 $S_c{}^*$ 58 $S_A$ 62 I

EXAMPLE 10

A mixture consisting of
1.3% of (S)-2-(4-decyloxybenzyloxy)-5-[4-(6-methyloctyloxy)phenyl]pyrimidine
39.5% of 4-(4-methylhexyloxy)phenyl (R,S)-4-decyloxybenzoate
32.6% of 5-octyl-2-(4-octyloxyphenyl)pyrimidine
16% of 5-decyl-2-(4-decyloxyphenyl)pyrimidine
10.6% of 5-decyl-2-(4-octyloxyphenyl)pyrimidine
has the phase sequence K 3 $S_c{}^*$ 62 $S_A$ 68 N* 69 I

We claim:

1. Smectic, liquid-crystal mixtures, comprising compounds of the formula (I)

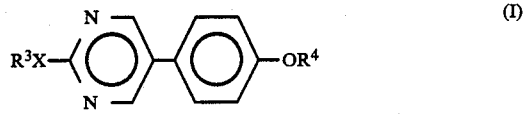

in which X is a single bond, —O or —S, and $R^3$ and $R^4$ are identical or different, straight-chain or branched alkyl groups having 7 to 14 carbon atoms which can contain asymmetric carbon atoms.

2. Mixtures as claimed in claim 1, having chiral, smectic liquid-crystal phases.
3. Mixtures as claimed in claim 1, having chiral, tilted smetic liquid-crystal phases.
4. Mixtures as claimed in claim 1, having chiral, smetic C phases ($S_c{}^*$).
5. Smectic, liquid-crystal mixtures having $S_c$ or $S_c{}^*$ phases comprising a combination of compounds of formula (I) as claimed in claim 1 with compounds of the formula (II),

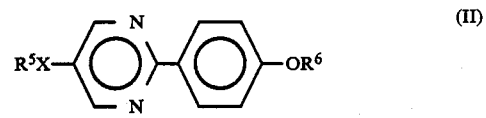

in which X is a single bond or —O, and $R^5$ and $R^6$ are identical or different alkyl groups having 6 to 15 carbon atoms.

* * * * *